(12) United States Patent
Davies et al.

(10) Patent No.: US 6,702,301 B1
(45) Date of Patent: Mar. 9, 2004

(54) ACTIVE WINDOW SEAL

(75) Inventors: Timothy Davies, Hermitage, TN (US); Charles Hopson, Lebanon, TX (US); Christos Kyrtsos, Southfield, MI (US); Joseph Tyckowski, Clawson, MI (US); Francois Breynaert, Caen (FR)

(73) Assignee: Meritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 09/404,668

(22) Filed: Sep. 23, 1999

(Under 37 CFR 1.47)

(51) Int. Cl.[7] .................................................. F16J 15/48
(52) U.S. Cl. ...................... 277/646; 277/628; 277/630; 277/312
(58) Field of Search ................................. 277/919, 321, 277/317, 312, 646, 605, 921, 630, 628

(56) References Cited

U.S. PATENT DOCUMENTS

| | | | | |
|---|---|---|---|---|
| 4,761,917 A | * | 8/1988 | Knect et al. ................ 277/637 |
| 5,253,453 A | * | 10/1993 | Maass et al. ................ 49/377 |
| 5,489,104 A | * | 2/1996 | Wolff ........................ 277/637 |
| 6,098,992 A | * | 8/2000 | Long et al. ................ 277/637 |

* cited by examiner

*Primary Examiner*—Anthony Knight
*Assistant Examiner*—Enoch E Peavey
(74) *Attorney, Agent, or Firm*—Carlson, Gaskey & Olds

(57) ABSTRACT

An active window seal assembly is disclosed that operatively engages a movable window when the window is stationary and disengages the window when the window is in motion. The seal assembly comprises a stationary frame, a movable lip that is operatively connected to the stationary frame, and a cavity disposed between the stationary frame and the movable lip. Several configurations provide for movement of the movable lip when the movable window is in motion. The first configuration allows the cavity to inflate with air, thus forcing the movable lip away from the window. A second configuration provides that the air in the cavity be evacuated, thus pulling the movable lip away from the window. A third configuration provides that a voltage be applied to the stationary frame and the movable lip to create an electric field. The electric field draws the movable lip toward the stationary frame and away from the movable window.

23 Claims, 3 Drawing Sheets

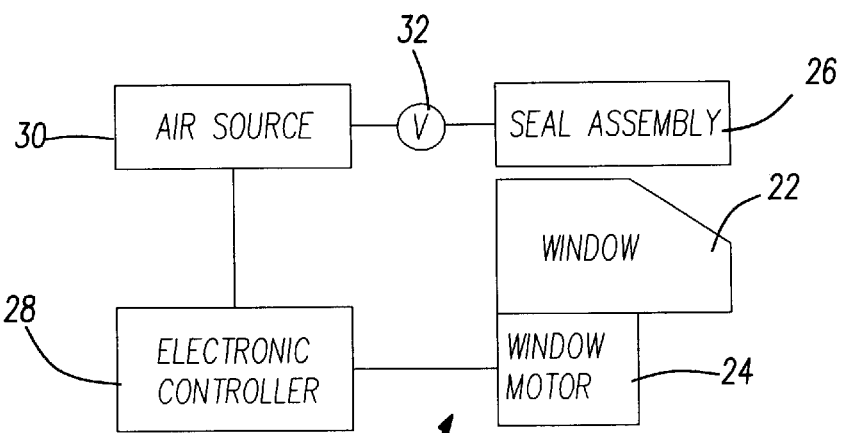
*Fig-1*
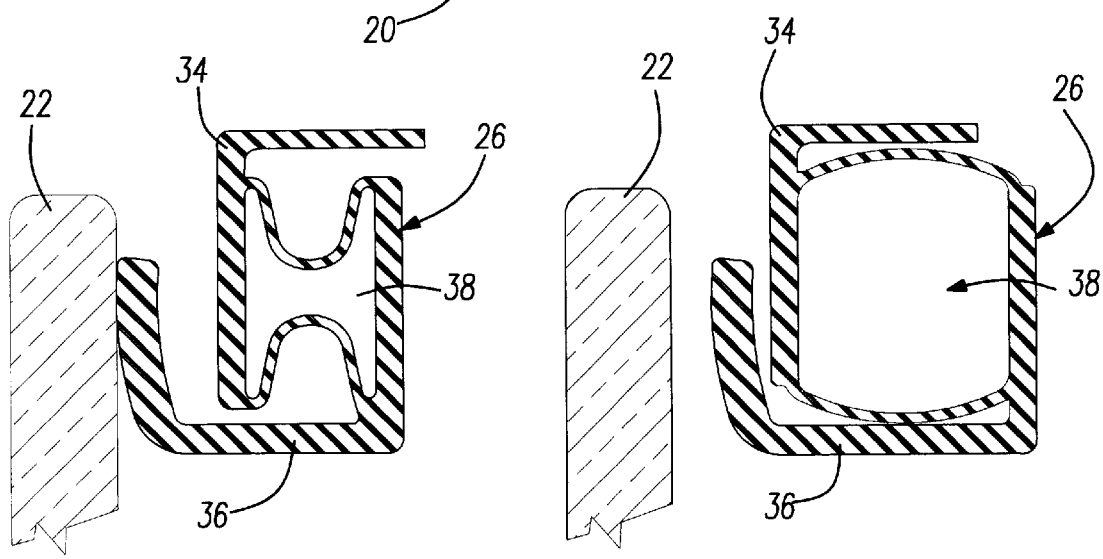
*Fig-2A*  *Fig-2B*
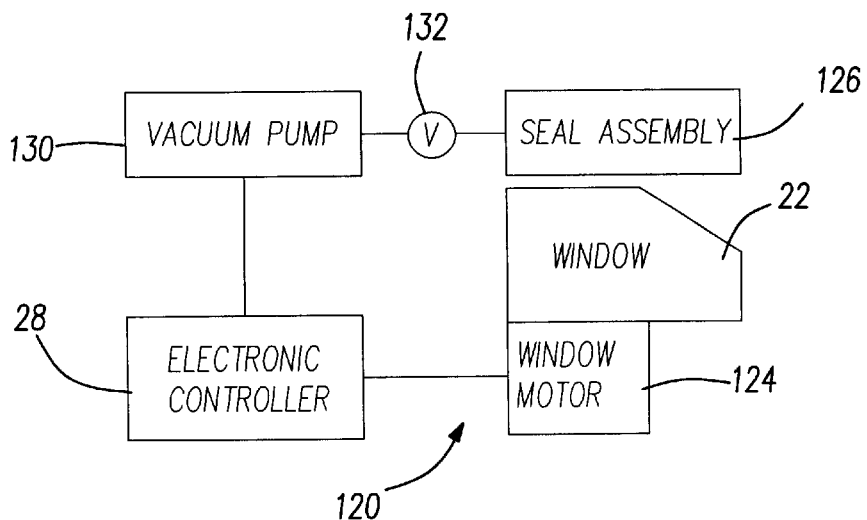
*Fig-3*

ACTIVE WINDOW SEAL

BACKGROUND OF THE INVENTION

This invention generally relates to a system for moving a seal away from a movable window when the movable window is in motion. This invention can be used with any movable window, but is preferably used with movable automotive windows. Further, this invention can be used with manual window systems, but is preferably used with automatic window systems.

Windows in vehicles typically have seals. It is an object of the automotive industry to reduce wind noise in the vehicle while the vehicle is in motion. Another object of the automotive industry is to reduce water from leaking into the vehicle around the windows.

One way to achieve these goals is to increase the force that the seal exerts on the window. The increased seal force reduces wind noise and prevents water from leaking around the seal. However, increasing the seal force on the window exaggerates several other difficulties encountered with movable window systems.

Automatic windows are designed to stop if they encounter an obstruction while being driven upwardly to close. It is necessary, but difficult, to differentiate the forces applied to the window to determine when an obstruction is encountered. Two categories of forces encountered by the window could be identified as normal or expected forces and foreign forces.

Typically, an obstruction is identified if the forces exerted on the window exceed a preselected threshold value. The preselected threshold value ideally represents the normal or expected forces encountered by the window system, including, but not limited to, the force exerted by the seal on the window.

However, these normal or expected forces are variable. For instance, the force exerted by the seal on the window varies with the temperature and the age of the seal. The force is higher at colder temperatures and when the seal is newer. Alternatively, the force decreases as the temperature rises and the seal ages.

The determination of an obstruction is made more difficult due to the varying expected forces encountered by the window system. Further, this difficulty is compounded by the increased window seal force, which results in a wider range of variation in seal force.

The differentiation of forces encountered by the window (i.e., expected forces v. foreign forces) would be greatly simplified if variable expected forces could be eliminated from the determination.

SUMMARY OF THE INVENTION

In general terms, this invention is an adjustable window seal assembly. The assembly can be used on any movable window, but is used preferably on automatically movable automotive windows. The adjustable window seal assembly operatively engages the movable window. The seal assembly engages the movable window when the movable window is stationary and has a reduced engagement force when the movable window is in motion.

The seal assembly consists of a stationary frame, a movable lip, and a cavity disposed between the stationary frame and the movable lip. These three elements are preferably formed as one piece of rubber. Three different scenarios as outlined below are disclosed to control the movement of the movable lip. Other embodiments are possible and within the broad teachings of this invention.

In one embodiment, the system also includes an air source, a valve and an electronic controller. When the electronic controller receives a signal that the window is about to begin moving, the electronic controller signals to the air source to start pumping air into the cavity through a valve. As the cavity fills with air, the movable lip is pulled away from the window thus reducing the seal force exerted on the window. When the electronic controller receives a signal that the window has stopped moving, the electronic controller signals to the air source to cease pumping air into the cavity. The valve is positioned to allow the air to escape from the cavity, thus forcing the cavity to collapse. Collapsing the cavity pushes the movable lip toward the window until the lip is biased against the window and the seal force is reapplied.

Alternatively, the system includes a vacuum pump, a valve and an electronic controller. When the electronic controller receives a signal that the window is about to begin moving, the electronic controller signals to the vacuum pump to start pumping air out of the cavity through a valve. In this embodiment, the stationary frame and the movable lip are configured such that as air evacuates from the cavity, the cavity collapses and the movable lip is pulled away from the window. As a result the seal force exerted on the window reduces. When the electronic controller receives a signal that the window has stopped moving, the electronic controller signals to the vacuum pump to cease pumping air out of the cavity. The valve is positioned to allow the air to reenter the cavity, thus forcing the cavity to expand. Expanding the cavity pushes the movable lip toward the window until the lip is biased against the window and the seal force is reapplied.

In another alternative, the system includes a voltage source and an electronic controller. Also, the rubber used to form the stationary frame, movable lip, and cavity is conductive rubber. When the electronic controller receives a signal that the window is about to begin moving, the electronic controller signals to the voltage source to apply a voltage to the seal assembly. In this embodiment, the stationary frame and the movable lip are configured similar to the vacuum system described above. In other words, as the voltage is applied the rubber becomes charged and creates an electric field that attracts the movable lip to the stationary frame, thus pulling the movable lip away from the window. As a result the seal force exerted on the window reduces. When the electronic controller receives a signal that the window has stopped moving, the electronic controller signals to the voltage source to cease applying a charge. The electric field is removed, thus forcing the movable lip toward the window until the lip is biased against the window and the seal force is reapplied.

This window seal system is advantageous because the seal force can be increased when the window is stationary, which reduces wind noise when the vehicle is in motion and also helps prevent water from leaking into the vehicle around the windows. Further, a smaller motor can be used to power the movement of the window because the motor has fewer forces to overcome.

BRIEF DESCRIPTION OF THE DRAWINGS

FIG. 1 is a schematic illustration of a system designed according to this invention.

FIG. 2A is a schematic illustration of selected portions of the system of FIG. 1.

FIG. 2B is a schematic illustration of selected portions of the system of FIG. 1.

FIG. 3 is a schematic illustration of an alternative embodiment of the system of FIG. 1.

DETAILED DESCRIPTION OF THE PREFERRED EMBODIMENT

Figures 4A, 4B:
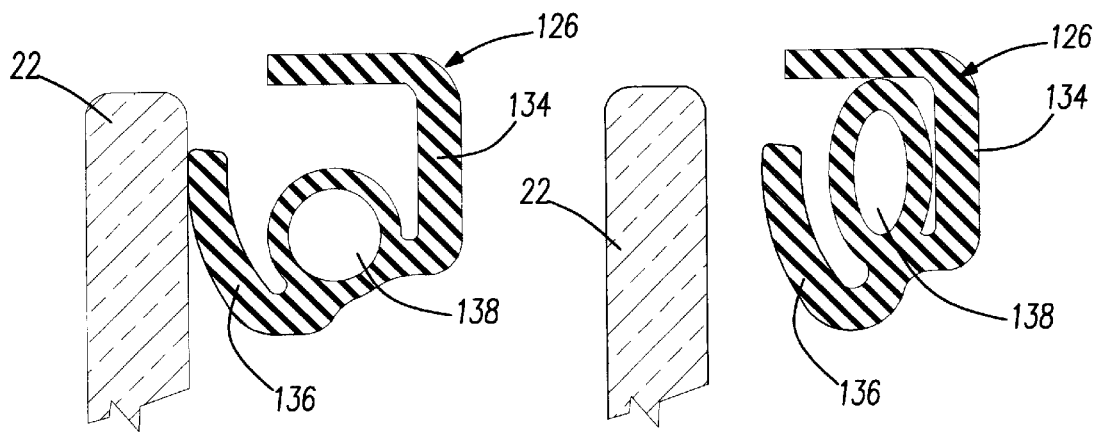
FIG. 4A is a schematic illustration of selected portions of the system of FIG. 3.
FIG. 4B is a schematic illustration of selected portions of the system of FIG. 3.

FIG. 1 schematically illustrates an adjustable window seal system, generally shown at 20. This invention can be used just at the base of a movable window or it can surround the entire window.

The assembly includes a movable window 22, a window motor 24 for controlling the movement of the movable window 22, a seal assembly 26, and an electronic controller 28. The preferred embodiment also includes an air source 30 and a valve 32.

Referring to FIGS. 2A and 2B, the seal assembly 26 in the preferred embodiment further includes a stationary frame 34, a movable lip 36 that is operatively connected to the stationary frame 34, and a cavity 38 disposed between the stationary frame 34 and the movable lip 36. Preferably the stationary frame 34, the movable lip 36 and the cavity 38 are molded as one piece of rubber.

The electronic controller 28 preferably communicates with the window motor 24 and with the air source 30 to determine the appropriate position of the movable lip 36. An input, such as from an operator controlled window switch, provides feedback as to desired movement of window 22. Motor 24 may also be controlled by controller 28. When the movable window 22 is stationary, the movable lip 36 engages the window 22. On the other hand, when the movable window 22 is in motion, the movable lip 36 preferably disengages the window 22.

Specifically, when the electronic controller 28 receives a signal that the window 22 should begin moving, the electronic controller 28 communicates with the air source 30. The electronic controller 28 signals the air source 30 to introduce air into the cavity 38 through the valve 32. As shown in FIG. 2B, when air is introduced into the cavity 38, it forces the movable lip 36 away from the window 22. While the lip 36 is shown removed from window 22, it should be understood that the benefits of this invention could be achieved simply by reducing the seal force on the window. That is, the seal lip 36 could remain in contact with the window even at the "removed" position, but at a greatly reduced force. This factor applies also to the alternative embodiments described below.

Alternatively, when the electronic controller 28 receives a signal that the window 22 is stationary, the electronic controller 28 signals the air source 30 to stop introducing air into the cavity 38. When the air source 30 shuts off, air is evacuated from the cavity 38 through the valve 32. As shown in FIG. 2A, the evacuated cavity 38 collapses, thus forcing the movable lip 36 toward the window 22 until the lip 36 is biased against the window 22 creating a large seal force against the window 22. As another alternative, it may only be desirable to reduce the seal force when the window is being driven to close, but not to open. That is, when the window is opening, obstructions are not a real problem. This also applies to the following alternative embodiments.

FIG. 3 illustrates an alternative embodiment of the adjustable seal system, generally shown at 120. This system also includes a movable window 22, a window motor 124 for controlling the movement of the movable window 22, a seal assembly 126, a valve 132, and an electronic controller 28. However, this alternative embodiment substitutes a vacuum pump 130 for the air source 30.

Other differences will be identified in FIGS. 4A and 4B. The seal assembly 126 in the first alternative embodiment also includes a stationary frame 134, a movable lip 136 that is operatively connected to the stationary frame 134, and a cavity 138 disposed between the stationary frame 134 and the movable lip 136. Preferably the stationary frame 134, the movable lip 136 and the cavity 138 are molded as one piece of rubber. However, as shown in FIGS. 4A and 4B, the configuration of these elements is slightly different than the configuration of these elements in the preferred embodiment (compare FIGS. 2A and 2B).

The electronic controller 28 preferably communicates with the window motor 124 and with the vacuum pump 130 to determine the appropriate position of the movable lip 136. When the movable window 22 is stationary, the movable lip 136 engages the window 22. On the other hand, when the movable window 22 is in motion, the movable lip 136 disengages the window 22.

Specifically, in this embodiment, when the electronic controller 128 receives a signal that the window 22 is about to begin moving, the electronic controller 28 communicates with the vacuum pump 130. The electronic controller 28 signals the vacuum pump 130 to draw air from the cavity 138. As shown in FIG. 4B, the evacuation of air from the cavity 138 causes the cavity 138 to collapse and pulls the movable lip 136 away from the window 22.

Alternatively, when the electronic controller 28 receives a signal that the window 22 is stationary, the electronic controller 28 sends a signal to the vacuum pump 130 and valve 132 to turn off. As shown in FIG. 4A, this causes the cavity 138 to fill with air and forces the movable lip 136 toward the window 22 to apply a force against the window 22.

Figure 5:
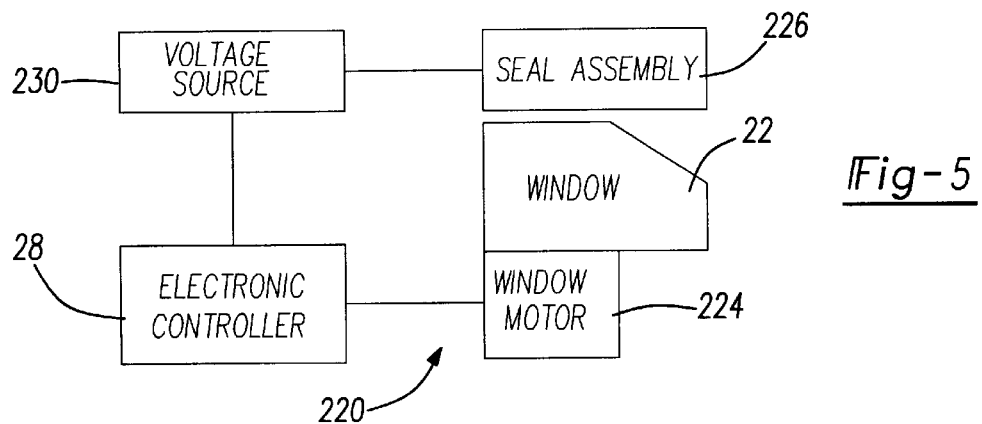
FIG. 5 is a schematic illustration of another alternative embodiment of the system of FIG. 1.

FIG. 5 illustrates another alternative embodiment of the adjustable seal system, generally shown at 220. The system 220 includes a movable window 22, a window motor 224 for controlling the movement of the movable window 22, a seal assembly 226, and an electronic controller 28. However, compared to the other embodiment, this embodiment substitutes a voltage source 230 for the air source 30.

Figures 6A, 6B:
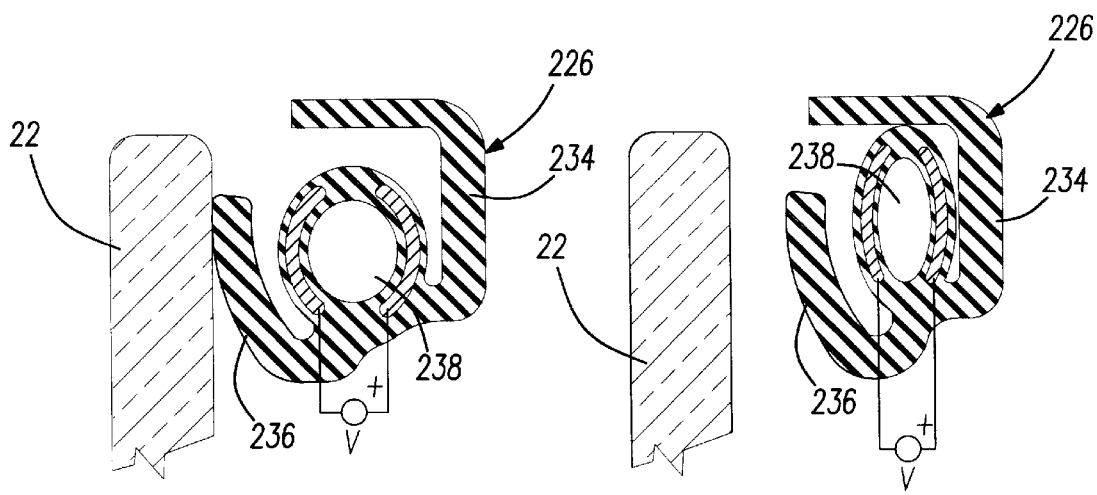
FIG. 6A is a schematic illustration of selected portions of the system of FIG. 5.
FIG. 6B is a schematic illustration of selected portions of the system of FIG. 5.

Other differences will be identified in FIGS. 6A and 6B. The seal assembly 226 in the second alternative embodiment includes a stationary frame 234, a movable lip 236 that is operatively connected to the stationary frame 234, and a cavity 238 disposed between the stationary frame 234 and the movable lip 236. Preferably the stationary frame 234, the movable lip 236 and the cavity 238 are molded as one piece from conductive rubber. As shown in FIGS. 6A and 6B, the configuration of these elements is the same as the configuration of these elements in the first alternative embodiment (compare FIGS. 4A and 4B).

The electronic controller 28 preferably communicates with the window motor 224 and with the voltage source 230 to determine the appropriate position of the movable lip 236. When the movable window 22 is stationary, the movable lip 236 engages the window 22. On the other hand, when the movable window 22 is in motion, the movable lip 236 disengages the window 22.

Specifically, in this second alternative embodiment, when the electronic controller 28 receives a signal that the window 22 is about to begin moving, the electronic controller 28 communicates with the voltage source 230. The electronic controller 28 signals the voltage source 230 to apply a voltage to the stationary frame 234 and the movable lip 236. As shown in FIG. 6B, the charged rubber creates an electric field that pulls the movable lip 236 away from the window 22. In other words, the stationary frame 234 and the movable lip 236 become electrically attracted to each other.

Alternatively, when the electronic controller 28 receives a signal that the window 22 is stationary, the electronic controller 28 sends a signal to the voltage source 230 to cease applying the voltage to the seal assembly 226. As shown in FIG. 6A, this causes removal of the electric field and forces the movable lip 236 toward the window 22 and away from the stationary frame 234. When the movable lip 236 rests against the window 22, it applies a force against the window 22.

The opposite could also be true. That is, the magnetic force could bias the seal towards the window, and the seal could be removed in a relaxed position.

Figure 7:
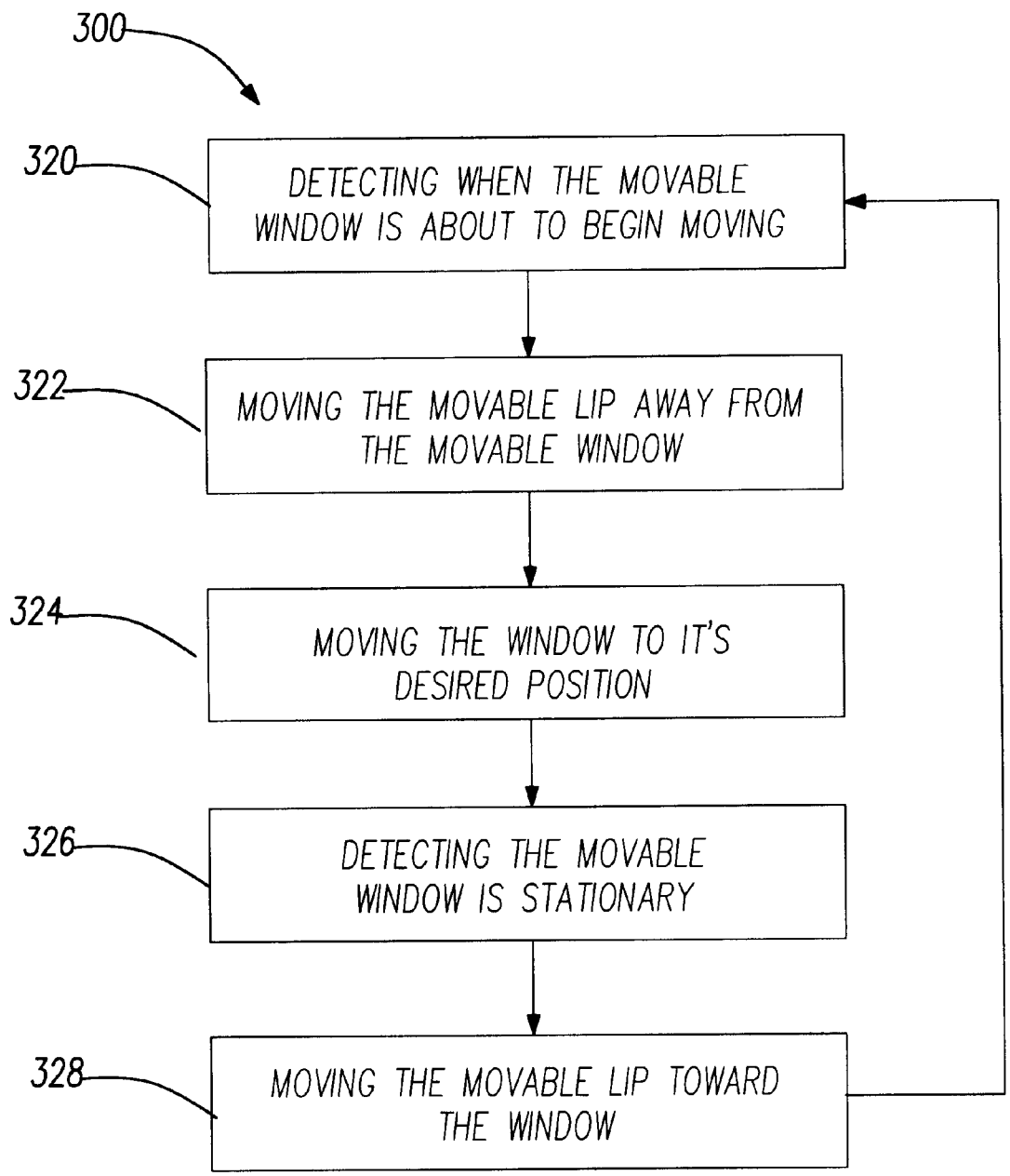
FIG. 7 is a flowchart diagram illustrating the preferred method of this invention.

FIG. 7 schematically illustrates the preferred method of operating the systems 20, 120, 220. The flow chart 300 includes a first step at 320 where the electronic controller 28 detects when the movable window 22 is about to begin moving. At 322 the electronic controller 28 sends a signal that the movable lip 36, 136, 326 should be moved away from the movable window 22. The movable window 22 is moved to its desired position at 324. The electronic controller 28 detects that the movable window 22 is stationary at 326. Finally, at 328, the electronic controller 28 sends a signal that the movable lip 36, 136, 236 should be moved toward the movable window 22. As can be appreciated from the flow chart 300, the systems 20, 120, 220 preferably continuously monitor the position of the movable window 22.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A vehicle window system comprising:
   a movable window;
   a seal assembly for sealing said movable window, said seal assembly operatively engaging said movable window with a first sealing force in an engaged position when said movable window is stationary and said seal assembly being movable to a disengaged position when said movable window is in motion wherein said seal assembly has a lower sealing force at said disengaged position, said seal assembly having a stationary frame, a movable lip that is operatively connected to said stationary frame, and a single cavity disposed between said stationary frame and said movable lip wherein said stationary frame, said movable lip and said cavity are molded as one piece of rubber; and a window motor for controlling movement of the movable window, and an electronic controller that communicates with said window motor and determines the appropriate position of said adjustable seal assembly.

2. The system of claim 1, wherein said seal assembly has an air source for introducing air into said air cavity, a valve for controlling the flow of air from said air source into and out of said cavity, and said electronic controller communicates with said air source.

3. The system of claim 2, wherein when said electronic controller receives a signal that said window will begin moving, said electronic controller communicates with said air source to introduce air into said cavity through said valve which forces said movable lip away from the window, and when said electronic controller receives a signal from said window motor that the window is stationary said valve evacuates air from said cavity which forces said movable lip toward the window and said movable lip applies said first force against said window.

4. The system of claim 1, wherein said seal assembly includes a vacuum pump for drawing air from said air cavity, a valve for controlling the flow of air into and out of said cavity, and said electronic controller communicates with said vacuum pump.

5. The system of claim 4, wherein when said electronic controller receives a signal that said window will begin moving, said electronic controller communicates with said vacuum pump to draw air from said cavity which forces said movable lip away from said window and when said electronic controller receives a signal from said window motor that the window is stationary said electronic controller sends a signal to said vacuum pump and said valve to turn off thus causing said cavity to fill with air which forces said movable lip toward the window.

6. The system of claim 1, wherein said lip is out of contact with said window in said disengaged position.

7. The system of claim 1, wherein said stationary frame is formed around said cavity such that said cavity is partially enclosed within said stationary frame.

8. The system of claim 7, wherein said stationary frame surrounds said cavity on at least two different sides.

9. The system of claim 1, stationary frame includes a base portion integrally formed with said movable lip and a transversely extending portion positioned in an overlapping relationship to a first side of said cavity.

10. The system of claim 9, wherein said cavity includes resilient cavity walls interconnecting said base portion and said movable lip to define an expandable and contractible cavity space.

11. The system of claim 10, wherein said movable lip includes a base portion formed with said cavity walls and a transversely extending portion positioned in an overlapping relationship to a second side of said cavity opposite from said first side such that said cavity is substantially enclosed by said stationary frame and said movable lip.

12. A vehicle window system comprising:
   a movable window;
   a seal assembly for sealing said movable window, said seal assembly operatively engaging said movable window with a first sealing force in an engaged position at least when said movable window is stationary, and said seal assembly movable to a disengaged position at least sometimes when said movable window is in motion, said seal having a lower sealing force when at said disengaged position and wherein said seal assembly includes a stationary frame, a movable lip that is operatively connected to said stationary frame, and a cavity disposed between said stationary frame and said movable lip, said stationary frame, said movable lip, and said cavity being formed from conductive rubber materials;

a window motor for controlling movement of the movable window;

an electronic controller that communicates with said window motor and determines the appropriate position of said adjustable seal assembly; and a voltage source for applying a voltage to said adjustable seal assembly wherein and said electronic controller communicates with said voltage source and receives a signal that said window will begin moving, said electronic controller communicates with said voltage source to apply a voltage to said adjustable seal assembly that produces an electric field causing a force that separates said movable lip away from the movable window, and when said electronic controller receives a signal from said window motor that said window is stationary said electronic controller communicates with said voltage source to cease applying a voltage to said adjustable seal assembly thus removing the electric field and causing said movable lip to move toward the window and allow said movable lip to apply a force against the window.

13. An adjustable window seal assembly for sealing around a movable window, said seal assembly comprising:

a stationary frame;

a movable lip that is operatively connected to said stationary frame and which is directly activated by a voltage source; and an electronic controller that determines the position of the movable window and communicates with said movable lip, wherein when the movable window is stationary said electronic controller signals to said movable lip to engage the movable window with a first force and when the movable window is in motion said electronic controller signals to said movable lip to move to a disengaged position at which said lip has a lower scaling force on the movable window wherein said lip is out of contact with said window in said disengaged position.

14. The assembly of claim 13, wherein said voltage source directly applies a voltage to said movable lip to move between engagement and disengagement positions via an electric field.

15. The assembly of claim 13, wherein and said electronic controller communicates with said voltage source and receives a signal that said window will begin moving, said electronic controller communicates with said voltage source to apply a voltage to said movable lip that produces an electric field causing a force that separates said movable lip away from the movable window, and when said electronic controller receives a signal from a window motor that the window is stationary said electronic controller communicates with said voltage source to cease applying a voltage to said movable lip thus removing the electric field and causing said movable lip to move toward the window and allow said movable lip to apply a force against the window.

16. A vehicle window system comprising:

a window movable between raised and lowered positions;

a window motor for controlling movement of said window between said raised and lowered positions;

a seal assembly for scaling against said window, said seal assembly including a stationary frame, a movable lip supported by said stationary frame, and a cavity enclosed by a cavity wall integrally formed with said movable lip and stationary frame wherein said stationary frame includes a first axial portion positioned on a first side of said cavity wall and a second axial portion extending transversely to said first axial portion and positioned in all overlapping relationship with said cavity on a second side adjacent to said first side such that said stationary frame partially surrounds said cavity; and an electronic controller in communication with said window motor and for controlling movement of said movable lip in response to window movement wherein said movable lip operatively engages said window with a first sealing force when said window is stationary and wherein said movable lip is moved to engage said window with a second sealing force, lower than said first sealing force, when said window is in motion.

17. The system of claim 16, wherein said movable lip includes a base portion integrally formed with said cavity walls and a transversely extending portion positioned in an overlapping relationship to a third side of said cavity opposite from said first side such that said cavity is substantially enclosed by said stationary frame and said movable lip.

18. The system of claim 17, wherein said cavity walls are formed from a resilient material to control movement of said movable lip in response to an increase or decrease in cavity size.

19. The system of claim 18 including a valve for controlling the flow of air from into and out of said cavity wherein said electronic controller communicates with said valve to increase or decrease cavity size to achieve said first or second sealing force.

20. The system of claim 19, including an air source for introducing air into said cavity via said valve wherein when said electronic controller receives a signal that said window will begin moving, said electronic controller communicates with said air source to introduce air into said cavity through said valve which increases cavity size and moves said movable lip in a direction away from the window to achieve said second sealing force, and when said electronic controller receives a signal from said window motor that the window is stationary said valve evacuates air from said cavity which decreases cavity size and forces said movable lip against said window at said first sealing force.

21. The system of claim 19, including a vacuum pump for drawing air from said air cavity via said wherein when said electronic controller receives a signal that said window will begin moving, said electronic controller communicates with said vacuum pump to draw air from said cavity which decreases cavity size and moves said movable lip in a direction away from the window to achieve said second sealing force and when said electronic controller receives a signal from said window motor that the window is stationary said electronic controller sends a signal to said vacuum pump and said valve to turn off thus causing said cavity to fill with air which increases cavity size and forces said movable lip against said window at said first sealing force.

22. The system of claim 18, including a voltage source that directly applies a voltage to said movable lip vary scaling force between said first and second sealing forces.

23. The system of claim 22, wherein said stationary frame and movable lip are charged via said voltage source to control movement of said movable lip relative to said stationary frame in an electric field.

* * * * *

UNITED STATES PATENT AND TRADEMARK OFFICE
CERTIFICATE OF CORRECTION

PATENT NO.    : 6,702,301 B1
DATED         : March 9, 2004
INVENTOR(S)   : Davies et al.

It is certified that error appears in the above-identified patent and that said Letters Patent is hereby corrected as shown below:

<u>Title page,</u>
Item [75], Inventors, please change "Charles Hopson, Lebanon, TX (US)" to read as
-- Charles Hopson, Lebanon, TN (US) --

Signed and Sealed this

Fourth Day of May, 2004

JON W. DUDAS
*Acting Director of the United States Patent and Trademark Office*